T. M. FREEBLE.
BRAKE.
APPLICATION FILED SEPT. 23, 1911.
1,122,582.
Patented Dec. 29, 1914.
2 SHEETS—SHEET 1.
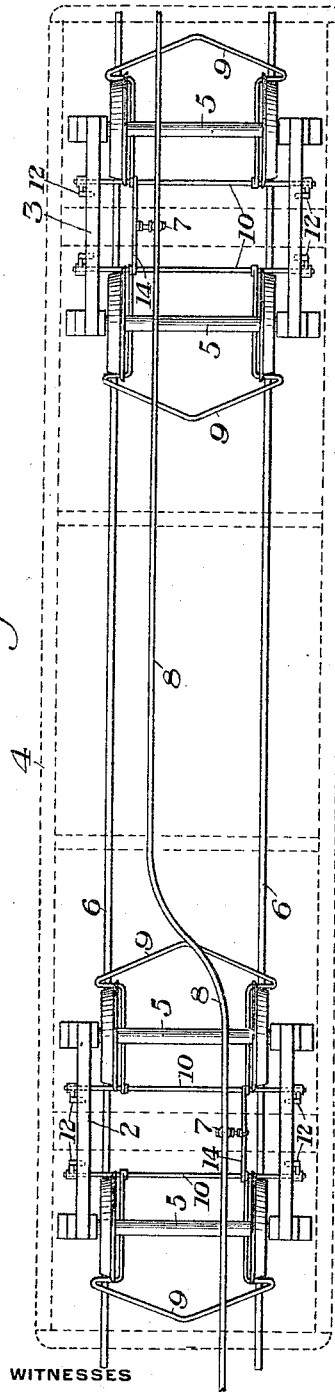
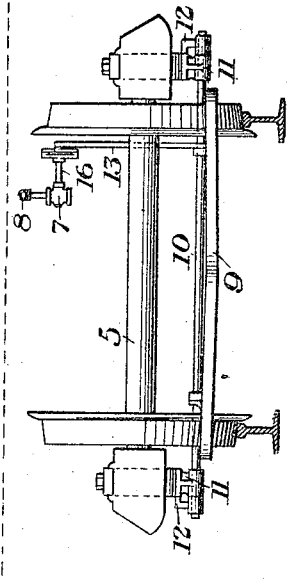
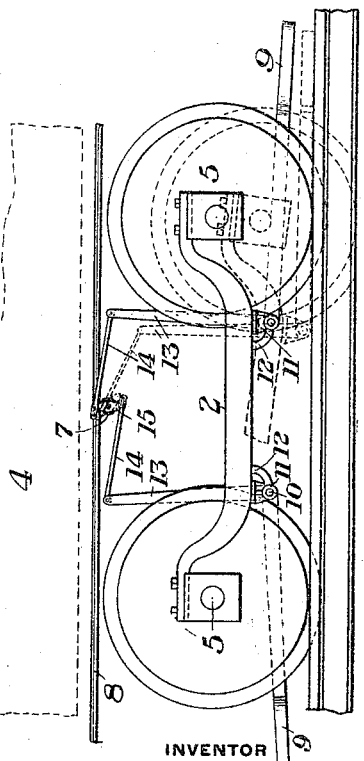
WITNESSES
R. A. Balderson
G. B. Fleming
INVENTOR
T. M. Freeble
by Bakewell, Byrnes, Parmelee
attys.

T. M. FREEBLE.
BRAKE.
APPLICATION FILED SEPT. 23, 1911.
1,122,582.
Patented Dec. 29, 1914.
2 SHEETS—SHEET 2.
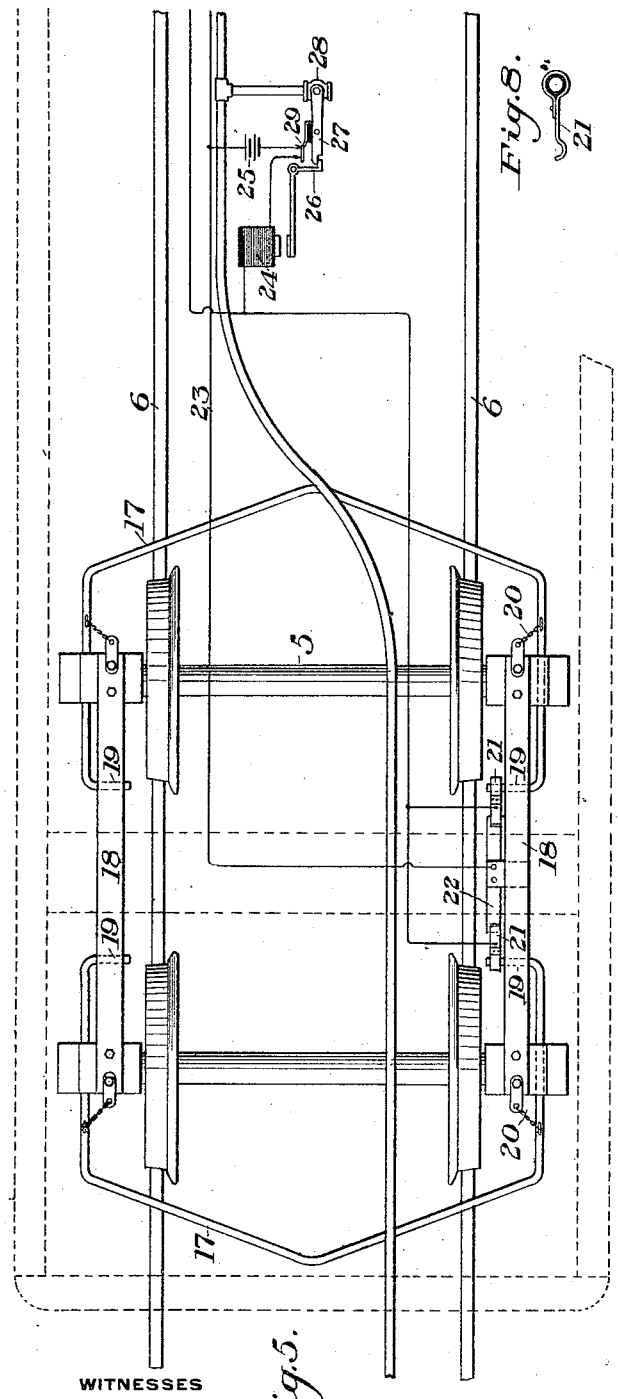
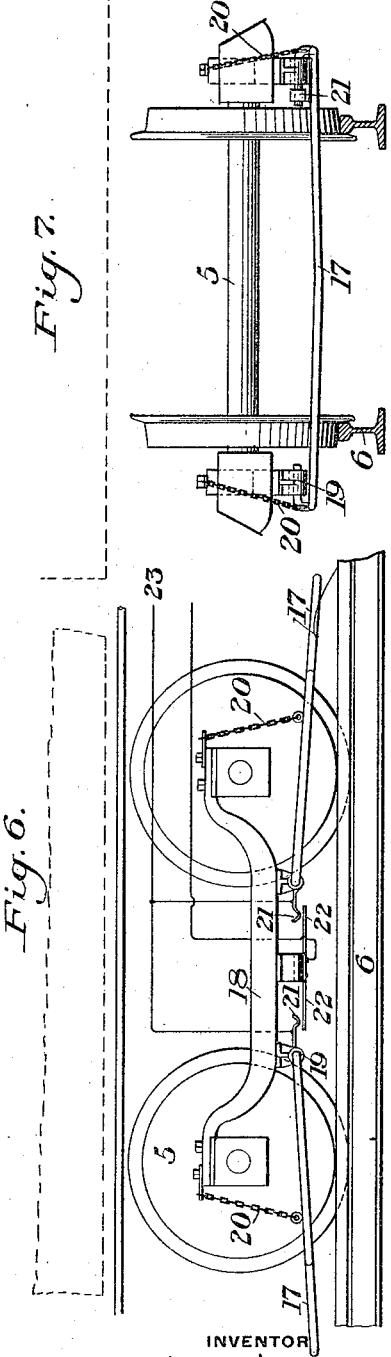

UNITED STATES PATENT OFFICE.

THOMAS M. FREEBLE, OF ROCHESTER, PENNSYLVANIA, ASSIGNOR OF ONE-HALF TO RAYMOND KAUFMANN, OF PITTSBURGH, PENNSYLVANIA.

BRAKE.

1,122,582.  Specification of Letters Patent.  Patented Dec. 29, 1914.

Application filed September 23, 1911. Serial No. 650,963.

*To all whom it may concern:*

Be it known that I, THOMAS M. FREEBLE, a resident of Rochester, in the county of Beaver and State of Pennsylvania, have invented a new and useful Improvement in Brakes, of which the following is a full, clear, and exact description, reference being had to the accompanying drawings, forming part of this specification, in which—

Figure 1 is a bottom plan view of a railway car showing one embodiment of my invention applied thereto. Fig. 2 is a side view of one end portion of the car. Fig. 3 is an end view. Fig. 4 is a detail view illustrating the connections with the valve stem. Fig. 5 is a bottom plan view of a portion of a car showing a modification of my invention. Fig. 6 is a side view and Fig. 7 an end view of Fig. 5, and Fig. 8 is a detail of one of the contacts.

My invention has relation to improvements in railway brakes, and is designed for use in connection with the ordinary air brake systems.

The purpose of my invention is to provide means of simple and effective character whereby if any pair of wheels on the car or train leaves the rails, an escape valve of the train brake pipe will be thereby automatically opened and cause one application of the brakes.

My invention is susceptible of various embodiments, two of which I have illustrated in the accompanying drawings and which will now be described.

Referring first to that form of my invention shown in Figs. 1 to 4 inclusive, the numerals 2 and 3 designate the frames of the car trucks of a car 4. 5 designates the wheels and axles of the trucks and 6 the track rails.

In accordance with my invention, I provide, adjacent to each wheel, a transversely extending trip device which, when the wheel leaves its rail, will contact with the rail, and thereby through suitable connections, will open an escape valve 7 in the usual train brake pipe 8. This trip device may be of various forms. Preferably, as shown in Figs. 1, 2 and 3, each device is common to the two wheels of each pair of truck wheels, extending transversely adjacent to the wheels and being of angular or V-form so as to act somewhat in the manner of the pilot of a locomotive to throw obstructions from the track of a nature which might cause accidental operation of the invention. As shown in these figures, each of the devices consists of this transverse portion designated 9, having each end portion thereof extending adjacent to a truck wheel, and normally held a short distance above the track rails. The device is shown as carried by a transverse shaft 10 which is pivotally supported in the bearings 11 carried by the side frames of the truck so as to bear a substantially fixed relation to the axles. The transverse portions 9 are held the proper distance above the track rails by means of the stops 12 on the shafts 10 which are arranged to engage the side frames or other relatively fixed parts of the truck. The two shafts 10 of each truck each have an extending lever arm 13, each of these arms being connected by a link 14 with opposite arms 15 attached to the stem 16 of the escape valve 7.

It will readily be seen that should any wheel leave the track rail, the transverse portion of the trip device adjacent to the said wheel will come in contact with the heads of the rails and will thereby actuate the rock shafts 10 to open the escape valve 7. If both pairs of wheels of any truck simultaneously leave the rails, both sets of trip devices carried by the truck will simultaneously act to open the valve.

In the modifications shown in Figs. 5, 6, 7 and 8, I provide trip devices which are arranged to control an electric circuit containing a magnet, which magnet is arranged to control an escape valve. In these figures, the numeral 17 designates the trip bars which, in this case, are pivoted directly to the side frames 18 of the truck, at 19, and are normally supported a short distance above the heads of the rails, by means of the chains or other suitable connections 20. Each device carries a contact 21 insulated therefrom, and normally separated from a coöperating contact 22 carried by the truck frame. The contacts 21 and 22 are connected to opposite sides of an electric circuit 23 which includes a battery 25. The two contacts 21 are shown as connected in multiple and when either pair of wheels leaves the track, the trip device 17 will engage the heads of the rails and thereby move the trip device into position to engage the corresponding contacts 21 and 22, thereby energizing an electromagnet 24 connected in said circuit. The armature of this magnet has an arm 26 which normally supports the lever 27 connected to the stem of the escape valve 28. When the magnet is energized, the armature 26 will be moved to release the lever 27 which then acts by gravity to open the valve 28. In order to immediately break the circuit of the magnet 24 after the valve 28 has been opened, I preferably provide the contact 29 mounted on the valve lever 27. When the lever 27 drops to open the valve, it will move this contact 29 to open the circuit of the magnet 24.

My invention provides simple and effective means to automatically apply the air brakes of a car or train in case any pair of wheels should leave the track.

It is obviously susceptible of various other embodiments than those described in the construction and arrangement of the trip members and in the connections, either mechanical or electric, by which said devices are caused to operate an escape valve of the train brake pipe.

I claim:

1. The combination with the air-brake system of a railway vehicle or train, of a trip-device carried by a truck of the vehicle or train and supported adjacent to but normally out of contact with the track rails, said device being arranged to be moved upwardly by contact with the track rails, and having a V-shaped portion extending across the track outside of the truck wheels and acting as a fender, and means actuated by the trip device when moved upwardly relatively to the truck by engagement with the track rails for effecting the operation of the brake system to apply the brakes; substantially as described.

2. The combination with a brake pipe having an escape valve, of trip devices carried by the car trucks and supported adjacent to the track rails in substantially fixed relation to the truck axles, but capable of an upward movement when brought into contact with the track rails, said devices having V-shaped portions extending across the track outside of the truck wheels and acting as fenders, and connections between said trip devices and the escape valve; substantially as described.

In testimony whereof, I have hereunto set my hand.

THOMAS M. FREEBLE.

Witnesses:
 GEO. B. BLEMING,
 R. M. CONWAY.

Copies of this patent may be obtained for five cents each, by addressing the "Commissioner of Patents, Washington, D. C."